United States Patent
Koob et al.

(10) Patent No.: US 7,111,289 B2
(45) Date of Patent: Sep. 19, 2006

(54) METHOD FOR IMPLEMENTING DUAL LINK LIST STRUCTURE TO ENABLE FAST LINK-LIST POINTER UPDATES

(75) Inventors: Christopher Koob, Pflugerville, TX (US); David P. Sonnier, Austin, TX (US)

(73) Assignee: Agere Systems, Inc., Allentown, PA (US)

( * ) Notice: Subject to any disclaimer, the term of this patent is extended or adjusted under 35 U.S.C. 154(b) by 924 days.

(21) Appl. No.: 10/026,351

(22) Filed: Dec. 21, 2001

(65) Prior Publication Data

US 2003/0121030 A1    Jun. 26, 2003

(51) Int. Cl.
*G06F 9/44* (2006.01)
(52) U.S. Cl. .................. 717/152; 717/162; 711/170; 711/171; 711/172; 711/173
(58) Field of Classification Search ........ 717/168–178, 717/152, 162; 711/103–200
See application file for complete search history.

(56) References Cited

U.S. PATENT DOCUMENTS

| | | | | |
|---|---|---|---|---|
| 6,430,666 B1 * | 8/2002 | Roth | .......................... | 711/202 |
| 6,598,143 B1 * | 7/2003 | Baker et al. | ................. | 711/200 |
| 6,694,388 B1 * | 2/2004 | Schzukin et al. | ............. | 710/52 |
| 6,701,420 B1 * | 3/2004 | Hamilton et al. | ........... | 711/170 |
| 2002/0184436 A1 * | 12/2002 | Kim et al. | ................... | 711/103 |

* cited by examiner

*Primary Examiner*—Wei Zhen
*Assistant Examiner*—Mulubrhan Tecklu

(57) ABSTRACT

A method is disclosed for free memory allocation in a linked list memory scheme. Free lists are link lists designating available memory for data storage. This method leverages the ability to read memory while concurrently updating a pointer to the next location. Multiple free lists are used to reduce the number of cycles necessary to allocate memory. The number of entries in each free list is tracked. When memory becomes available, it is spliced into the shortest free list to achieve balance between the free lists. The free list structure disclosed consists of head, head +1, and tail pointers where head +1 is the next logical address pointed to from the head pointer location. The free list consists only of the head and tail pointers. Each link list structure of memory to be freed contains the head, head +1, and tail pointers. This allows us to simultaneously allocate and free with only 1 memory cycle. This structure provides the ability to free and allocate memory for further processing without executing the allocate step. A whole logical data packet can be spliced into a free list in one processing cycle. Utilization of the dual link lists reduces the bandwidth requirements for free memory allocation. Balancing of these dual lists is achieved by splicing a freed block of memory into the shortest list. The splicing method disclosed also reduces the processing cycles necessary to allocate and free memory.

12 Claims, 3 Drawing Sheets

LINK LIST STRUCTURE OF MEMORY TO BE FREED

METHOD FOR IMPLEMENTING DUAL LINK LIST STRUCTURE TO ENABLE FAST LINK-LIST POINTER UPDATES

BACKGROUND OF THE INVENTION

This invention relates in general to a methodology for optimizing the allocation of free memory blocks using link lists and, more particularly, to a method and implementation of a dual link list structure for free memory.

Conventional link lists methods of data storage for shared memory, i.e., volatile or random access memory (RAM), require that the link list be read every time a block of memory needs to be allocated. These methods typically determine a free list, a link list defining a block of available memory, when the head-tail pointer is established and when a block of memory needs to be allocated. Allocation of memory using this process takes longer than the time available in some pipelined architectures.

Another method to process memory allocation is described in U.S. Pat. No. 6,049,802 to Waggener and Bray entitled "System And Method For Generating A Linked List In A Computer Memory". This patent discloses link lists that contain several key list parameters. A memory manager determines to which link list the data belongs based on key list parameters. This patent also discloses that the address of the next location in the link list is determined before data is written to the current location. While this allows the next address to be written in the same cycle in which data is written, the free list scheme disclosed does not address optimization for the allocation and management of free memory blocks. The method of the '802 patent appends and maintains a single free list.

One more memory storage technique is described in U.S. Pat. No. 5,303,302 issued to Burrows entitled "Network Packet Receiver With Buffer Logic For Reassembling Interleaved Data Packets". In this patent, a network controller receives encrypted data packets. A packet directory has an entry for each data packet stored in a buffer. Each directory entry contains a pointer to the first and last location in the buffer where a corresponding data packet is stored along with status information for the data packet. A method is also disclosed for partial data packet transmission management for the prevention of buffer overflow. Processing optimization for the allocation and management of free memory blocks is not achieved in this method.

In addition, neither of the above patents addresses the issue of an allocation and a free list occurring concurrently. In that case, extra memory bandwidth is required to both do the allocation step of reading from the free list and then splicing onto the free list.

SUMMARY OF THE INVENTION

Among the several features and advantages of this invention is the optimization of free memory allocation processing. In some systems, it takes longer to read memory than the time available to allocate memory. In accordance with one embodiment of the present invention, a method is disclosed for free memory allocation in a linked list memory scheme. Free lists are link lists designating available memory for data storage. This method leverages the ability to read memory while concurrently updating a pointer to the next location. Multiple free lists are used to reduce the number of cycles necessary to allocate memory. The number of entries in each free list is tracked. When memory becomes available, it is spliced into the shortest free list to achieve balance between the free lists. The free list structure disclosed consists of head, head +1, and tail pointers where head +1 is the next logical address pointed to from the head pointer location. The free list consists only of the head and tail pointers. Each link list structure of memory to be freed contains the head, head +1, and tail pointers. This allows us to simultaneously allocate and free with only 1 memory cycle. This structure provides the ability to free and allocate memory for further processing without executing the allocate step. A whole logical data packet can be spliced into a free list in one processing cycle. Utilization of the dual link lists reduces the bandwidth requirements for free memory allocation. Balancing of these dual lists is achieved by splicing a freed block of memory into the shortest list. The splicing method disclosed also reduces the processing cycles necessary to allocate and free memory.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

The method disclosed is for data storage in a linked list memory scheme. Link lists are typically used to partition computer memory chaining data together regardless of the physical storage location. Each storage location for a link list consists of a pointer field and a data field. The pointer field stores the address for next memory location for the chain of data. The data field contains actual data at the current location in memory. Link lists designating memory that is available for data storage are referred to as free lists.

Conventional processing for memory allocation requires that the free list be read every time a block of memory gets allocated. This approach is performed in two-steps. The first step requires reading the free list (i.e., available memory) head pointer to determine the beginning location of memory to be allocated. Once the head pointer is determined, the second step reads the entry at this head pointer establishing a new head pointer for the free list. Using this sequential processing scheme takes longer to determine the new head pointer than the rate allowed to allocate blocks of memory in a pipelined architecture (i.e., the memory allocation rate is less than the time required to read the memory).

Figure 1:
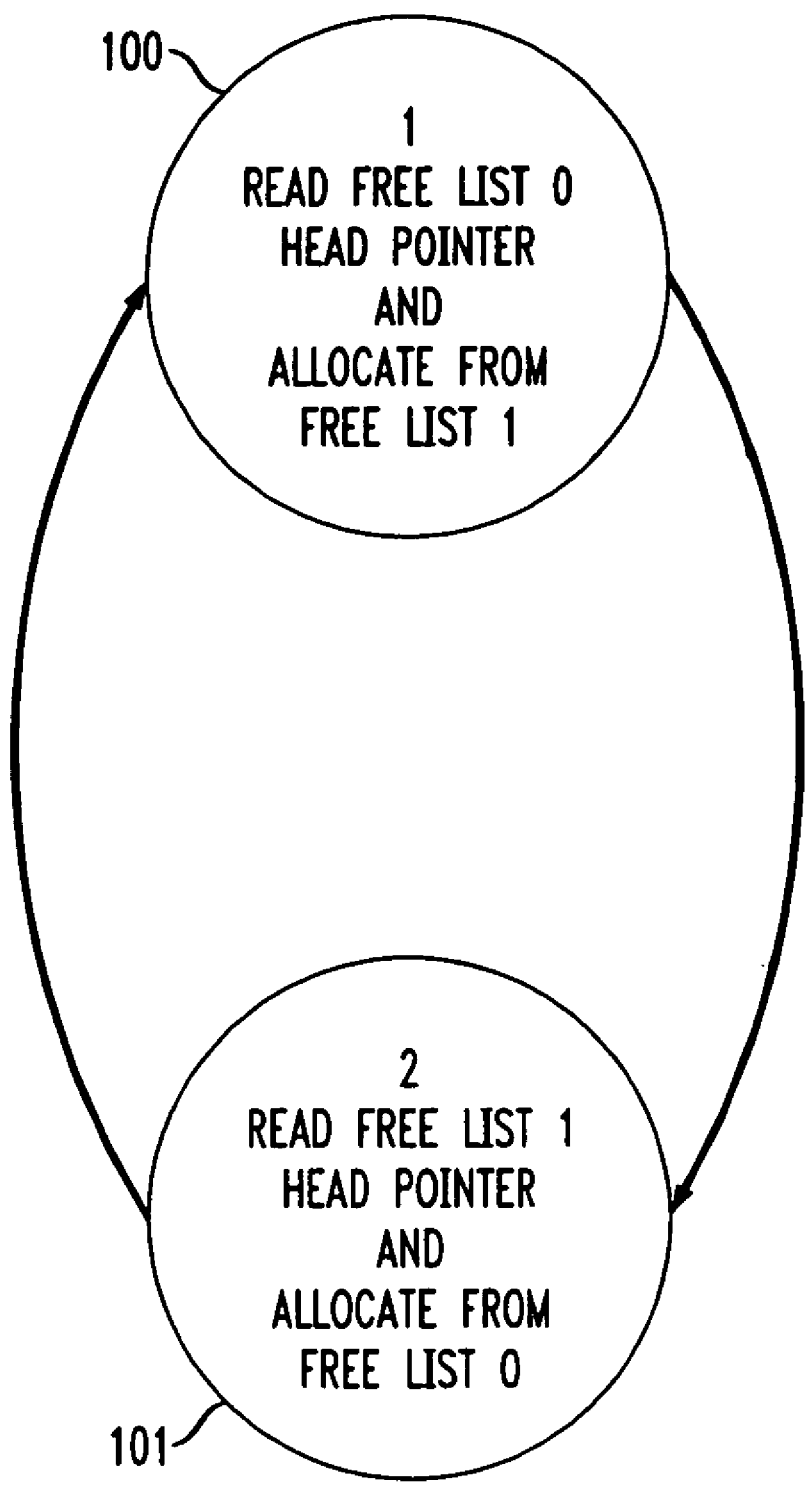
FIG. 1 is a state diagram indicating the alternate processing supporting dual free lists.

One embodiment of the disclosed method utilizes a dual free list structure to address these bandwidth constraints in a pipelined architecture. Using a dual free list structure alleviates the sequential processing dependency for memory allocation. FIG. 1 is a state diagram that illustrates the processing for these two free lists. This method leverages the ability to read memory while concurrently updating a pointer to the next location. As shown in the first state 100 of the diagram, the head pointer of the first free list is read concurrently with executing an allocation of a block of memory from the second free list. The alternating state 101 reads the head pointer from the second free list while concurrently allocating a block of memory from the first free list. Using this method, processing is optimized to only one processing cycle.

In one example using a particular type of RAM, it takes 45 nanoseconds to read memory but only 37 nanoseconds are available to allocate a new block of memory. One important note is that the time required to read the RAM is a latency problem. While the latency to read the RAM is 45 nanoseconds, a read can be completed every 7.5 nanoseconds. Since there are two free lists to allocate from, the time available to allocate memory from a single free list doubles (i.e., becomes 75 nanoseconds). The 45 nanosecond read rate can now be accommodated. Employing the conventional two-step sequential processing approach would not be fast enough to meet these throughput requirements.

Figure 2:
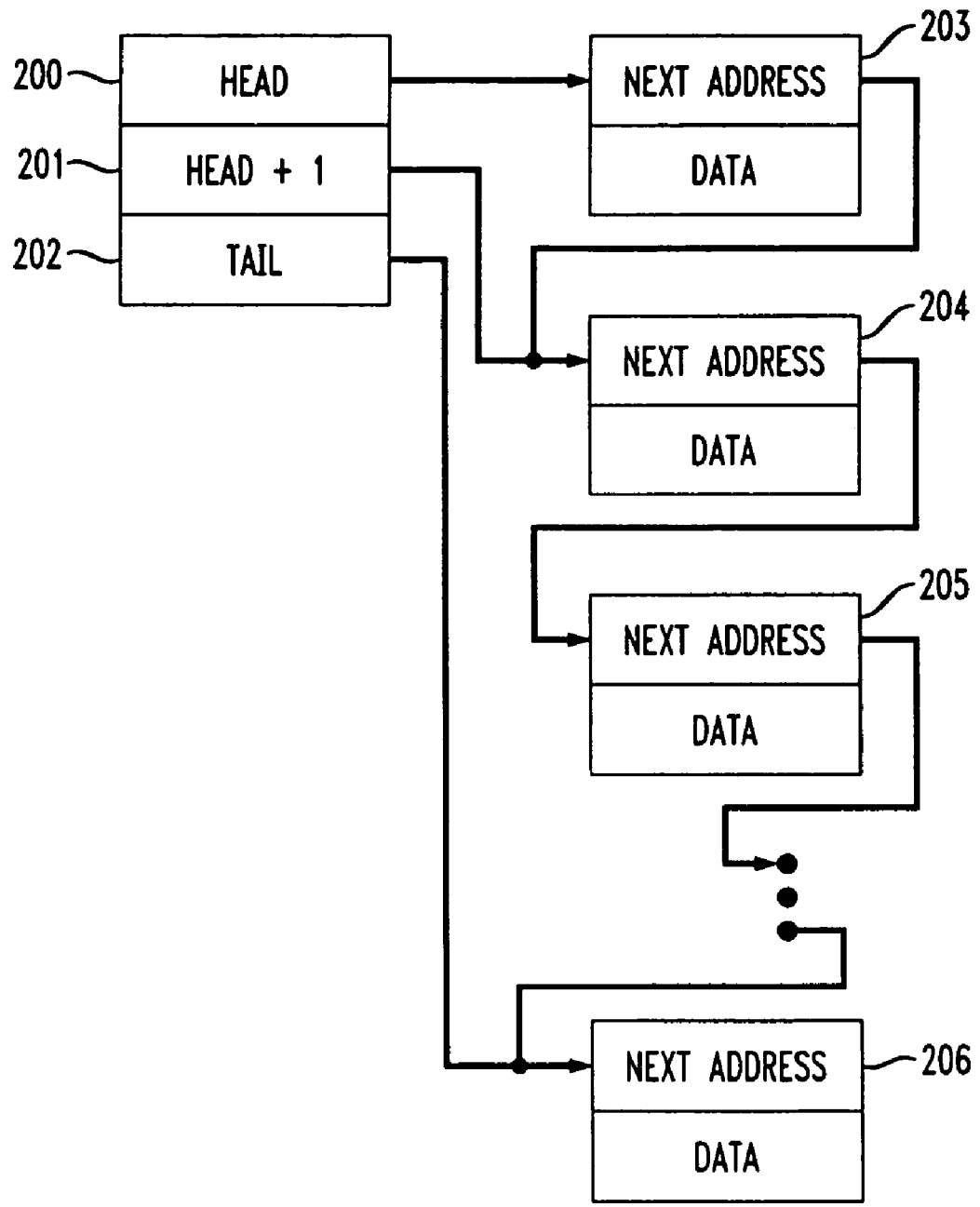
FIG. 2 is a block diagram of the link list structure of memory to be freed.

The method disclosed also optimizes processing by utilizing the structure depicted in FIG. 2 for link lists that are to be freed. The structure consists of a head pointer 200, a head +1 pointer 201, and a tail pointer 202. The head pointer 200 provides the next address 203 in the link list. The head +1 pointer 201 is associated with the second address 204 in the chain. The tail pointer 202 is associated with the last address in the link list 206. Additional address pointers such as next address 205 are logically chained together in the link list structure.

The memory allocation step can be skipped using this link list structure, which optimizes processing throughput. As noted earlier, the sequential processing for memory allocation typically consists of first reading the head pointer of the free list to determine the beginning of the free (i.e., available) memory. Then, reading the entry at the head pointer, which provides the new head pointer for the free memory list. Using the unique free list structure defined obtains the new head pointer for free memory (i.e., the head +1 pointer 201) at the same time it reads the head pointer. Therefore, the allocation step is skipped because the new head pointer for free memory has already been established (i.e., the new head pointer is the head +1 pointer 201).

This method employs two free lists where memory is constantly being allocated and freed. A balance is maintained between these free lists by tracking the number of entries in each list. As memory blocks are freed, they are spliced into the free list that contains the smallest number of entries. The link list structure of FIG. 2 is also leveraged to optimize splicing memory that becomes available for insertion into a free list.

Figure 3:
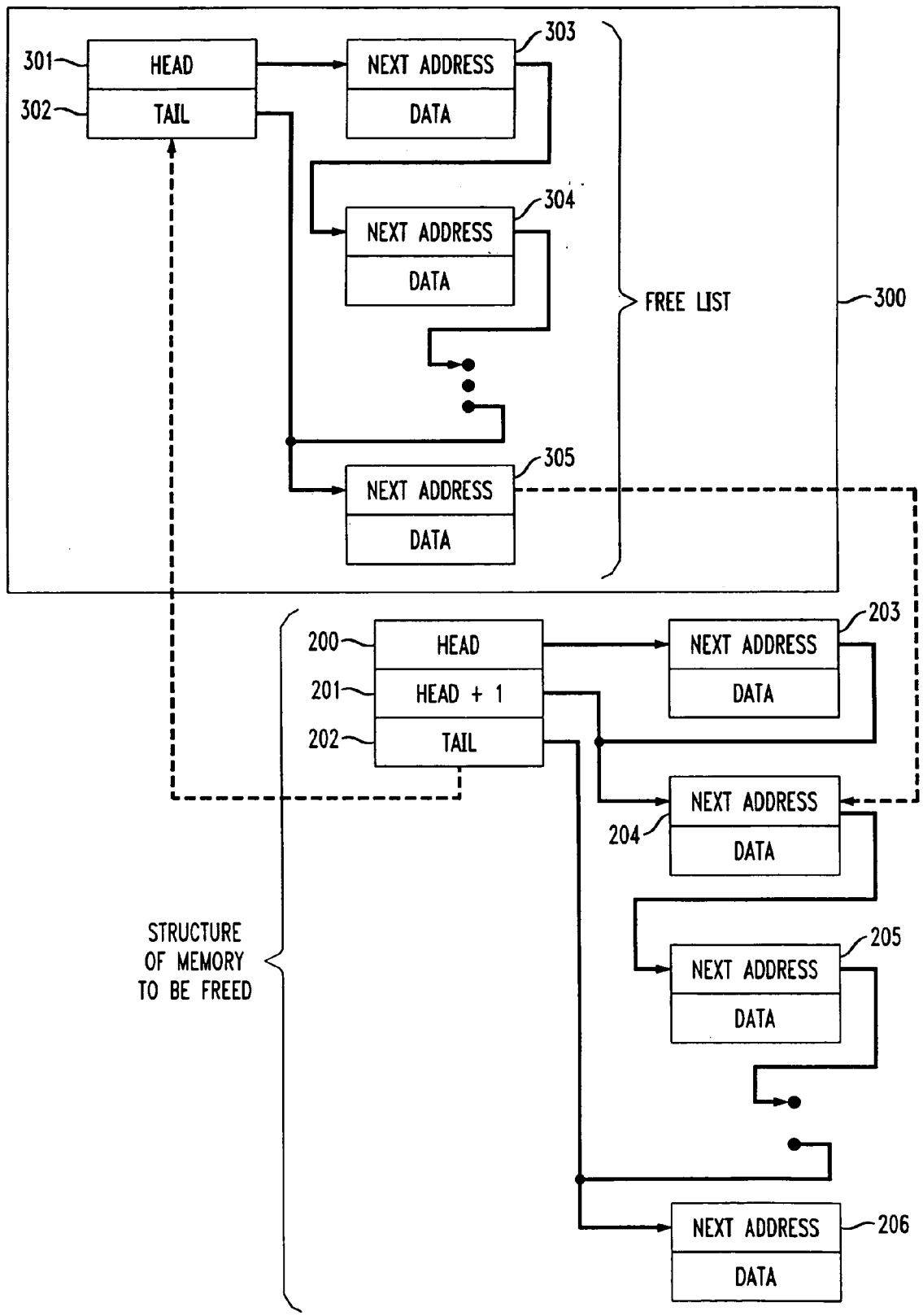
FIG. 3 is a block diagram depicting memory splicing.

Free pages are always allocated from head and spliced to tail. This allows non-coherent access for allocating a head pointer and adding to the tail. FIG. 3 depicts splicing memory to be freed into the free list structure. The free list 300 consists of the head pointer 301, which provides the first address 303 available. The data structure supports subsequent addresses 304. The last address 305 is the tail pointer 302 of the free list 300.

When memory is to be freed, it is spliced into a free list. Using the head pointer 200, head +1 pointer 201, and tail pointer 202 permits a whole packet to be spliced into the free list in one operation. To splice a memory packet into the free list 300, the free list tail pointer 302 becomes the head +1 pointer 201 and the tail pointer of the memory structure to be freed 202 becomes the new tail pointer 302.

For example, a packet of memory consists of 10 blocks. The current state of processing requires the 10 blocks of memory be freed and a block of memory be allocated. The first block of memory in the packet will be allocated and the remaining 9 blocks will be freed. This is achieved in one operation where the head pointer 200 becomes the first location in memory that is allocated; and the head +1 pointer 201, the second pointer get spliced into the existing free list along with the tail pointer 202. The tail pointer 202 becomes the new free list tail pointer 302. Therefore, everything from the head +1 pointer to the tail pointer becomes freed memory. Splicing from the head +1 pointer to the tail pointer puts the whole packet except for the first block into freed memory saving memory processing cycles. Applying this method ensures that the simultaneous allocation and freeing of memory is never encountered. Memory is either being allocated or freed but never both at the same time. A link list is considered "empty" when it contains a single entry.

While only certain preferred features of the invention have been shown by way of illustration, many modifications and changes will occur to those skilled in the art. It is, therefore, to be understood that the present claims are intended to cover all such modifications and changes, which fall within the true spirit of the invention.

What is claimed is:

1. A method for managing data storage in a memory, comprising:
    creating at least two free link lists having entries designating available free memory locations;
    tracking the number of entries in each of the free link lists;
    identifying free memory locations as such locations become available for data storage; and
    splicing available memory locations onto the shortest one of the free link lists.

2. The method of claim 1 wherein available memory locations to be spliced onto the free link lists are structured as a freed memory link list comprising a head pointer, a head plus one pointer, and a tail pointer.

3. The method of claim 2 and including the steps of allocating from the head pointer of the freed memory link list and splicing from the head plus one to the tail pointer of the freed memory link list.

4. The method of claim 3 and including the steps of simultaneously allocating and freeing memory locations.

5. The method of claim 4 and including the step of setting tail pointer of a free link list to the head pointer plus one of the freed memory link list.

6. The method of claim 3 and including the step of setting tail pointer of a free link list to the head pointer plus one of the freed memory link list.

7. The method of claim 5 and including the step of setting the free link list tail pointer to the address of the tail of the last freed memory location.

8. A method for managing data storage in a memory, comprising:
    creating at least two free link lists identifying available data storage locations in the memory;
    storing data in a plurality of data locations in the memory wherein each block of data is stored in a link list and each link list includes a head and a tail;
    reading a head pointer from one of the free link lists to determine a beginning location of a block of data to be stored; and
    simultaneously allocating data storage at a location of a head pointer of the other of the free link lists.

9. The method of claim 8 and including the step of maintaining a plurality of free link lists wherein each list identifies different lists of available memory.

10. The method of claim 8 and including the step of adding available link lists to a shortest one of the free link lists so as to maintain balance between the free link lists.

11. The method of claim 8 wherein the plurality of free link lists comprises two free link lists.

12. The method of claim 8 and including the steps of simultaneously allocating and freeing memory in one memory cycle.

* * * * *